United States Patent
Sang, Jr. et al.

(10) Patent No.: US 7,240,047 B2
(45) Date of Patent: *Jul. 3, 2007

(54) APPARATUS AND METHOD FOR MARKET-BASED DOCUMENT LAYOUT SELECTION

(75) Inventors: Henry W. Sang, Jr., Cupertino, CA (US); Charles A. Untulis, Sunnyvale, CA (US); Giordano B. Beretta, Palo Alto, CA (US); Scott H. Clearwater, Portola Valley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 530 days.

This patent is subject to a terminal disclaimer.

(21) Appl. No.: 10/326,062

(22) Filed: Dec. 23, 2002

(65) Prior Publication Data

US 2004/0122806 A1  Jun. 24, 2004

(51) Int. Cl.
*G06F 17/30* (2006.01)
*G06F 15/16* (2006.01)

(52) U.S. Cl. ................ 707/3; 707/1; 707/4; 707/100; 709/218; 709/228

(58) Field of Classification Search ............ 707/1, 707/3, 100; 382/284; 700/233; 705/1, 26, 705/37; 709/218, 228; 715/517, 788
See application file for complete search history.

(56) References Cited

U.S. PATENT DOCUMENTS

| | | | |
|---|---|---|---|
| 5,289,571 A | 2/1994 | Harada et al. | 395/148 |
| 5,438,512 A | 8/1995 | Mantha et al. | 364/419.1 |
| 5,895,476 A | 4/1999 | Orr et al. | 707/517 |
| 5,895,477 A | 4/1999 | Orr et al. | 707/517 |
| 5,953,722 A | 9/1999 | Lampert et al. | 707/100 |
| 6,185,558 B1 | 2/2001 | Bowman et al. | 707/5 |
| 6,222,947 B1* | 4/2001 | Koba | 382/284 |
| 6,366,918 B1* | 4/2002 | Guttman et al. | 707/100 |
| 2002/0122067 A1* | 9/2002 | Geigel et al. | 345/788 |
| 2004/0003097 A1* | 1/2004 | Willis et al. | 709/228 |

* cited by examiner

*Primary Examiner*—Jeffrey Gaffin
*Assistant Examiner*—Tony Mahmoudi (57) ABSTRACT

A method and apparatus for market-based document layout selection use an automated auction or bartering system, i.e., an automated page layout system, to place objects within a page and automatically generate a page layout that is pleasing to a user. An object refers to any item that can be individually selected and manipulated, and may include shapes and pictures that appear on a display screen. The method and apparatus improve the quality of page layout in terms of user preferences, and optimize the speed at which various objects are arranged on a page in a pleasing manner. In addition, the resulting page layout may be consistent among pages because all pages are arranged according to a common algorithm.

24 Claims, 5 Drawing Sheets

APPARATUS AND METHOD FOR MARKET-BASED DOCUMENT LAYOUT SELECTION

CROSS-REFERENCE TO RELATED PATENT APPLICATIONS

This application is related to commonly assigned U.S. patent application Ser. No. 10/326,057, filed Dec. 23, 2002, entitled "APPARATUS AND METHOD FOR MARKET-BASED DOCUMENT CONTENT AND LAYOUT SELECTION" to Scott H. CLEARWATER; U.S. patent application Ser. No. 10/326,088, filed Dec. 23, 2002, entitled "APPARATUS AND METHOD FOR MARKET-BASED DOCUMENT CONTENT SELECTION" to Scott H. CLEARWATER; U.S. patent application Ser. No. 10/326,089, filed Dec. 23, 2002, entitled "APPARATUS AND METHOD FOR DOCUMENT CONTENT TRADING" to Scott H. CLEARWATER, et al.; U.S. patent application Ser. No. 10/326,702, filed Dec. 23, 2002, entitled "APPARATUS AND METHOD FOR CONTENT RISK MANAGEMENT" to Scott H. CLEARWATER, and U.S. patent application Ser. No. 10/326,058, filed Dec. 23, 2002, entitled "APPARATUS AND METHOD FOR MARKET-BASED GRAPHICAL GROUPING" to Henry W. SANG, Jr., et al., all of which are concurrently herewith being filed under separate covers, the subject matters of which are herein incorporated by reference.

TECHNICAL FIELD

The technical field relates to document selection systems, and, in particular, to market-based document layout selection systems.

BACKGROUND

Page layout is important for document creation or other applications that display pages of information to users. A page layout system arranges and places information to include text and/or pictures in a manner that is pleasing to the users. Current page layout systems require the users to either use standard form software to drag and drop objects into desired places or use pre-designed templates. These approaches typically require extensive user interaction. For example, the drag and drop solution is time consuming, whereas the template limits page layout options.

Some current solutions also focus on complicated rule sets that are difficult to maintain and understand. For example, since many page layout circumstances cannot be known in advance, a rule-based approach may easily cause error when unanticipated situations occur. Furthermore, while contingencies can in principle be codified, the resulting page layout system is not easily maintainable because the rules can interact with each other in complicated and unforeseen ways.

SUMMARY

A method for market-based document layout selection includes selecting a plurality of page layouts from a database. The page layouts are generated by placing objects within a page of a document. The method further includes constructing a plurality of virtual documents using the plurality of selected page layouts, evaluating the plurality of selected page layouts with respect to user preferences, and calculating values of the plurality of virtual documents based on the evaluation. If the value of the corresponding virtual document increases, the method consummates a trade from an old layout to one of the plurality of selected layouts. After a stopping criterion is met, a preferred layout is generated from the plurality of selected layouts for document rendering.

A corresponding apparatus for market-based document layout selection includes a system configuration input for setting configuration parameters for a layout selection algorithm, a user preference input for setting user preferences for the layout selection algorithm, and an automated page layout system capable of using the layout selection algorithm to automatically generate a page layout based on the user preferences. The automated page layout system includes a layout broker for supervising and coordinating the page layout generation.

DESCRIPTION OF THE DRAWINGS

The preferred embodiments of the method and apparatus for market-based document layout selection will be described in detail with reference to the following figures, in which like numerals refer to like elements, and wherein.

DETAILED DESCRIPTION

A method and corresponding apparatus for market-based document layout selection use an automated auction or bartering system, i.e., an automated page layout system, to place objects within a page and automatically generate a page layout that is pleasing to a user. An object refers to any item that can be individually selected and manipulated, and may include shapes and pictures that appear on a display screen. The method and apparatus improve the quality of page layout in terms of user preferences, and optimize the speed at which various objects are arranged on a page in a pleasing manner. In addition, the resulting page layout may be consistent among pages because all pages are arranged according to a common algorithm.

With the market-based document layout selection approach, document elements compete with each other in a "market" where a page tries to "buy" a layout that the page deems valuable. The value of a particular page is based on a number of factors relating to user preferences, such as price or style. The advantage of a market-based approach is that the market-based approach does not require a fixed set of rules that must be able to handle all possible contingencies.

Figure 1:
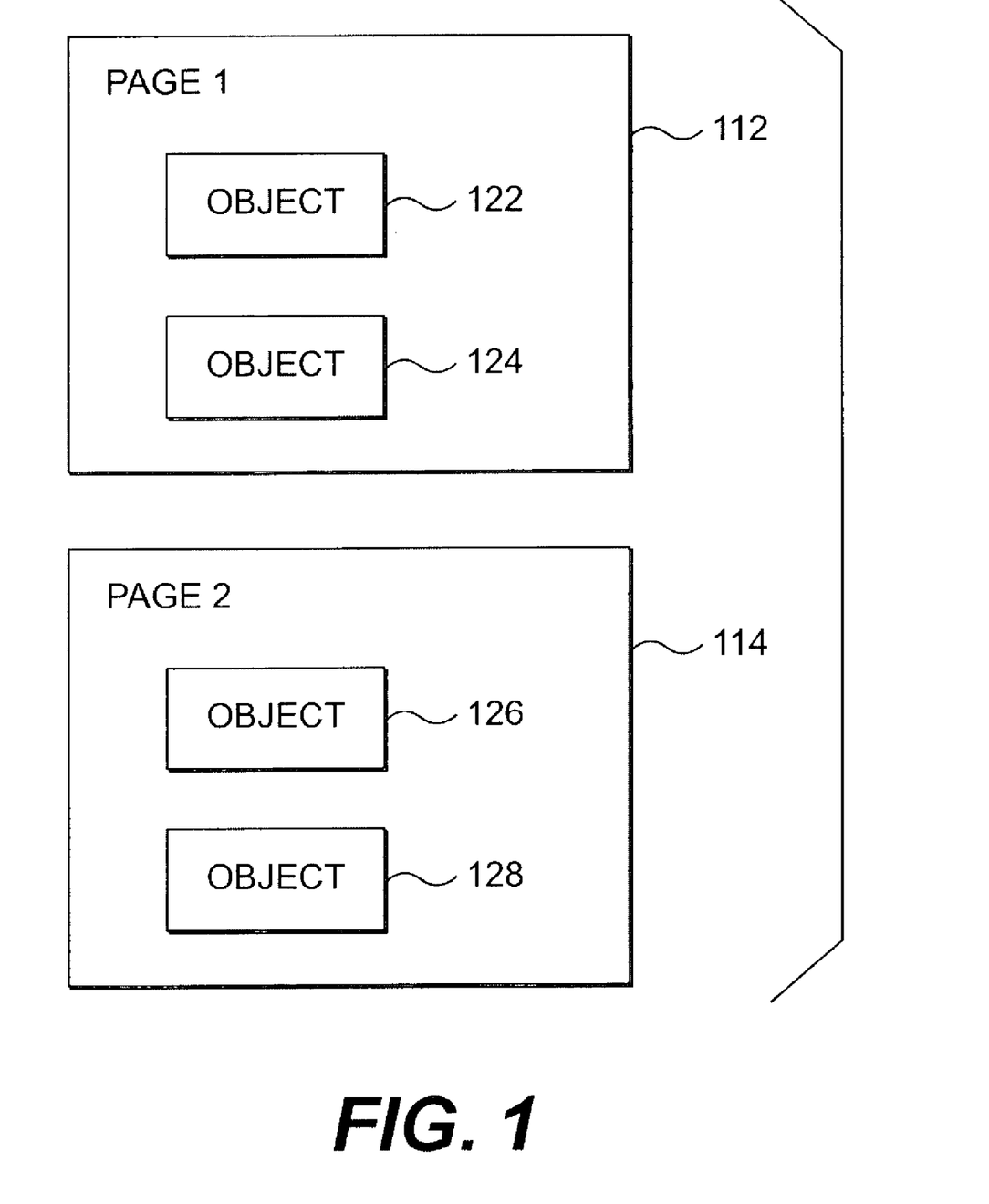
FIG. 1 illustrates an exemplary document with pages that include various objects.

To generate a page layout for a document, a designer first places different objects on pages. An object may include both data and programmed procedures that allow manipulation of that data. Examples of the objects include images, tables, columns of information, boxes of data, graphs of data, audio snippets for electronic versions of assignments, active pages such as an applet for electronic version, animations or the like. The images may be drawings or photographs in color or black and white. An active page is a page that changes layout when a user modifies an object on the page. FIG. 1 illustrates an exemplary document with Page 1 (112), Page 2 (114). Page 1 (112) includes objects 122, 124, whereas Page 2 (114) includes objects 126, 128.

In arranging the objects 122, 124, 126, 128 on the pages 112, 114, the designer may encounter design issues such as object placement, object rotation, object scale or size or the like. Object placement refers to where on the page to place the object and how many objects to place on that page. Object rotation refers to whether all objects are to be placed vertically, or some placed horizontally or diagonally. Scale of the object refers to how much space to be allocated to each object.

The automated page layout system may position and size the objects of a page and automatically create a page layout based on criteria, such as user preferences. In particular, the system determines the overall effective and pleasing design of the page based on user provided preferences, while minimizing the amount of time spent by the user. The user preferences may be quantified by a number of parameters relating to each object to be placed on the page. The parameters may be defined and included in user preferences 202 (shown in FIG. 2 and described in detail later).

Examples of such parameters may include spacing, balance, emphasis, order, color, grouping, visibility or occlusion, reflowing for a dynamic presentation, graceful degradation, class constraints or the like. For example, the user can define space parameters to describe the page layout in terms of white space amount or how random the objects are placed on the page. The user can also choose to place items on a grid so that the items line up with other elements. Balance is a user-defined parameter that determines whether the page should be symmetrical or asymmetrical with respect to size, shape, color and texture of the object. In addition, the user can define the type of object that first receives attention. The user can also decide whether one object is the main focus on the page or whether all objects are emphasized equally. Also, the user can define whether an order to the objects is appropriate or if random placement is adequate. The order can be geometric order, lexicographic order based on keys, or viewing order. One skilled in the art will appreciate that other ordering methods are equally possible. Similarly, the user can define whether certain objects should be grouped together because the objects belong together or because the objects look like. Likewise, the user may group darker images at the bottom of the page and important reminders near the top of the page.

With respect to visibility or occlusion, for example, a collage presentation style is normally composed of overlapping images. Users can define how much of the image or text is visible and how much is occluded. In addition, part of a first object may be occluded, but visible through a transparent object laid on top of the first object. The amount of occlusion and transparency may be negotiated among the objects through a market-based trading system 270 (shown in FIG. 2 and described in detail later). Reflowing for a dynamic presentation means changing line breaks and generating appropriate positioning operators at the beginning of the next line or next space (sequential or available) on the page. Also, if a blank space is filled in with an entry that is longer or higher than the blank space, the automated page layout system may reflow the passage. With respect to graceful degradation, if the negotiation among objects is not successful, the automated page layout system may use a preselected algorithm to perform the layout, such as a first-selected-first-placed or a last-selected-first-placed algorithm. In addition, objects can have class constraints, so that the bounding boxes of all objects of a given class are aligned to the same left indentation, for example.

The automated page layout system also allows the user the set page parameters. These parameters are not used to perform the automatic layout, but to set an overall continuity to the pages. Page parameters include items such as overall font size, type of font, size of page, feathering, resolution of page, style issues or the like. Therefore, if the user lays out five to six pages of objects, continuity may be preserved across the entire group of pages.

Symmetry is another criterion that may affect the user preferences 202 used by the automated page layout system. Two general types of symmetry exist: where-level symmetry and spatial symmetry. Where-level symmetry refers to page level context that the underlying symmetry is being measured. Three types of where-level symmetry may occur: page level symmetry, subpage level symmetry, and spread level symmetry. Specifically, page level symmetry refers to symmetry at the page level, that is, symmetry that appears on a page. Subpage level symmetry refers to symmetry that appears within a particular area on a page. Spread level symmetry refers to symmetry that is spread across two pages in a page spread.

Spatial symmetry includes mirror or reflexive symmetry, radial symmetry, and symmetry with respect to axes or margins on or off the page. Mirror or reflexive symmetry refers to some kind of balance with respect to some axis. In radial symmetry, the page elements are arranged in ever expanding circles or radii around the center of the page. Symmetry axes need not be defined on the page and need not be limited to horizontal or vertical axes.

Figure 2:
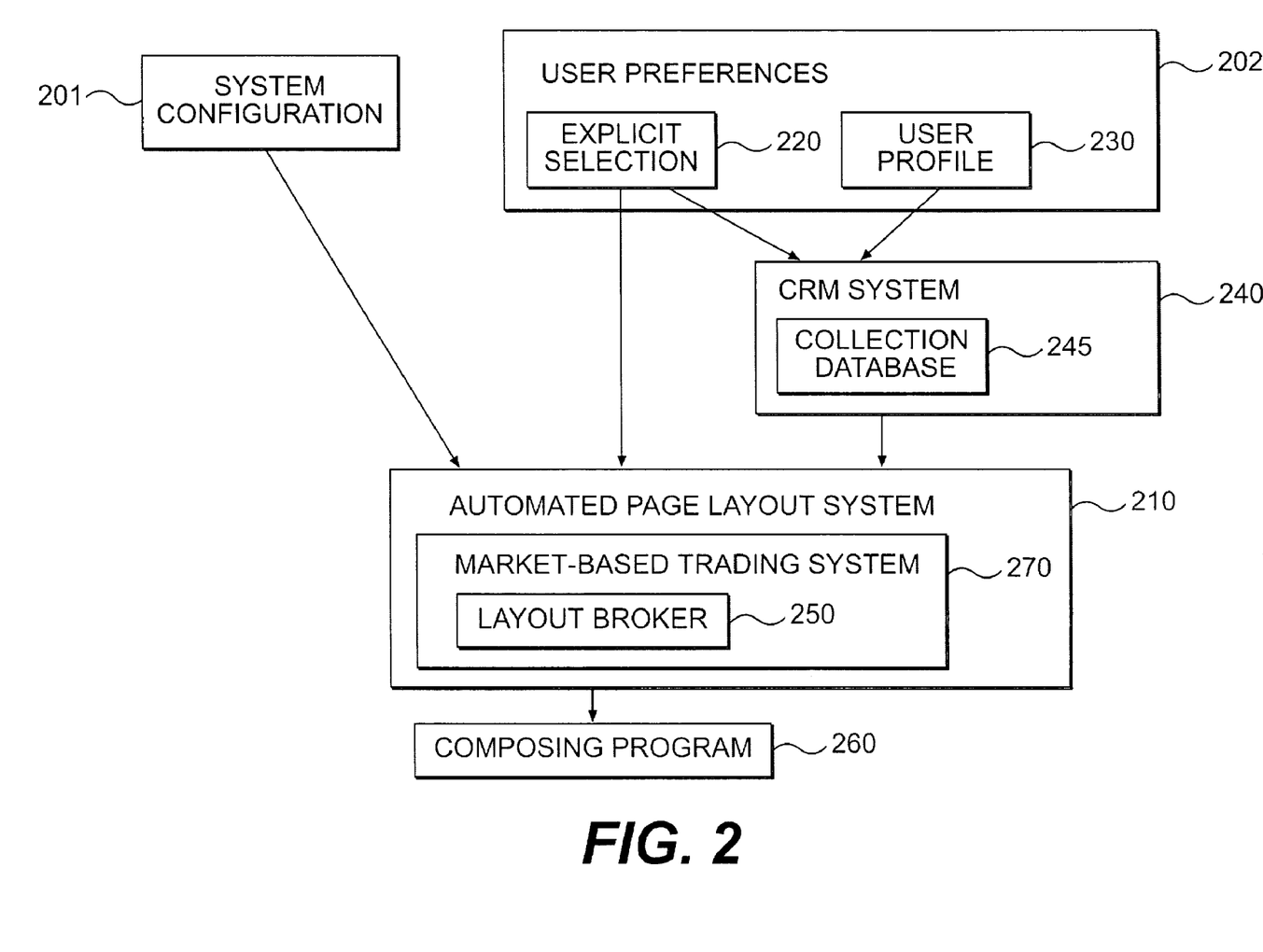
FIG. 2 illustrates an exemplary automated page layout system, according to one embodiment of the present invention.
Figure 3A:
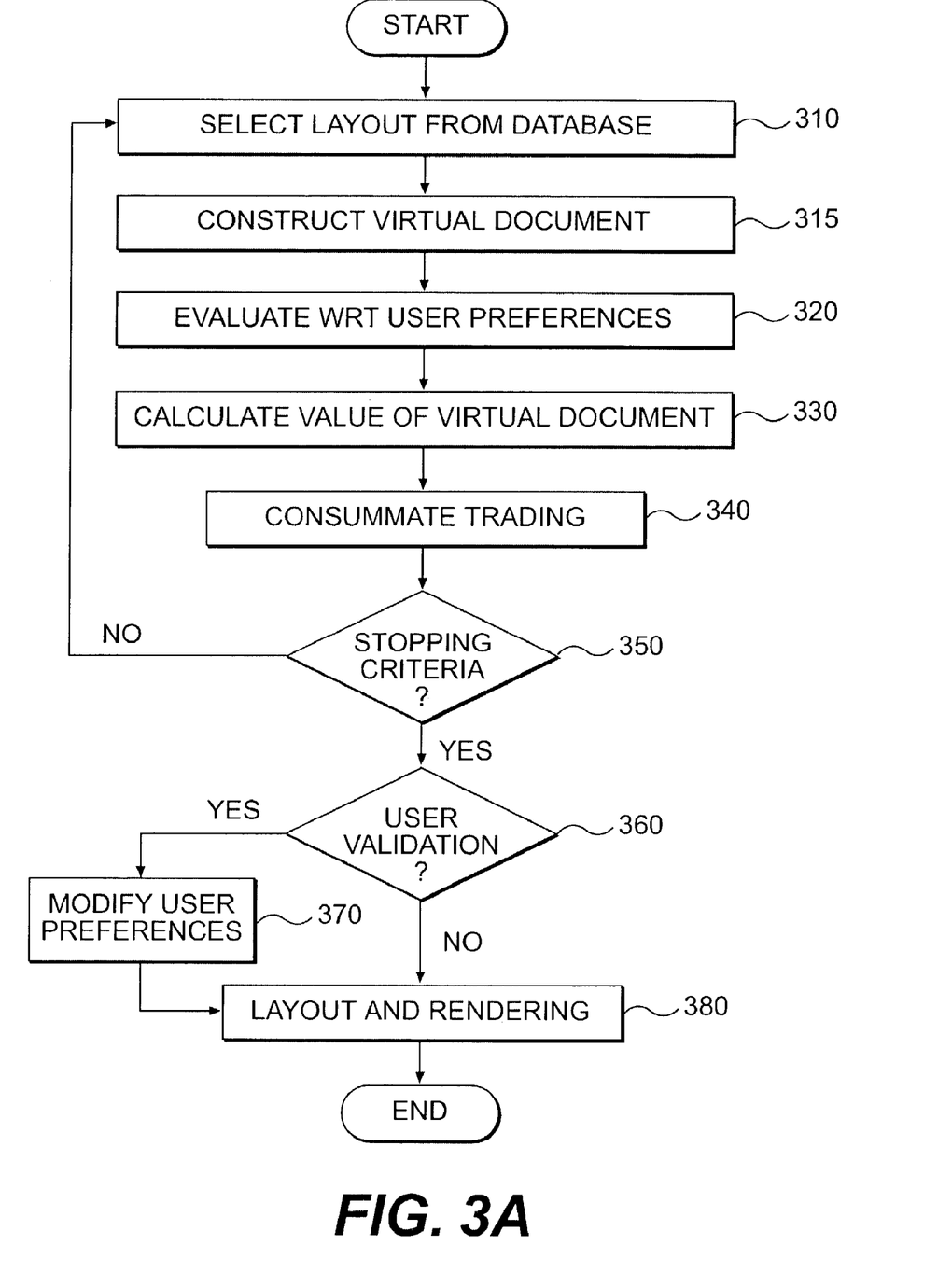
FIG. 3A is a flow chart illustrating an exemplary operation of a layout broker, according to another embodiment of the present invention.

FIG. 2 illustrates an exemplary automated page layout system 210 that utilizes a market-based trading system 270 to place objects within a page and to automatically generate a page layout that is pleasing to a user. The market-based trading system 270 uses a layout selection algorithm (described in detail with respect to FIG. 3) and may include a layout broker 250 for supervising and coordinating the type of layout to be placed on various pages of a document. The automated page layout system 210 may have inputs from system configuration 201 and user preferences 202. The system configuration input 201 serves to set configuration parameters for the running of the layout selection algorithm. The user preferences input 202 sets the user preferences for actual layout selection. Table 1 illustrates exemplary parameters of the system configuration input 201. Table 2 illustrates exemplary data structures of the user preference input 202.

TABLE 1

| | System configuration | | |
|---|---|---|---|
| Port Operations | Msg Type | Msg Data | Msg Data Type |
| get_configuration_ requirements | Input | Configuration_ type | String |
| | Output | attribute_value_ pairs | attribute_value_pairs |
| Get_all_ configurations | Input | Administrator_ profile | administrator_profile |
| | Output | Configuration_ descriptions | configuration_ descriptions |
| Get_a_ configuration | Input | Configuration_ id | String |
| | Output | Configuration_ description | configuration_ description |

TABLE 1-continued

System configuration

| Port Operations | Msg Type | Msg Data | Msg Data Type |
|---|---|---|---|
| New_configuration | Input | attribute_value_pairs | attribute_value_pairs |
| | | Configuration_type | String |
| | Output | Configuration_id | String |
| modify_configuration | Input | Configuration_id | String |
| | | attribute_value_pairs | attribute_value_pairs |
| | Output | Configuration_id | String |
| Set_configuration | Input | Authorization | String |
| | | attribute_value_pairs | attribute_value_pairs |
| | Output | Configuration_id | ascii_file |

TABLE 2

User preference

| Port Operations | Msg Type | Msg Data | Msg Data Type |
|---|---|---|---|
| Get_profile_requirements | Input | profile_type | String |
| | Output | attribute_value_pairs | attribute_value_pairs |
| Get_all_profiles | Input | user_profile | user_profile |
| | Output | profile_descriptions | profile_descriptions |
| Get_a_profile | Input | profile_id | String |
| | Output | profile_description | profile_description |
| New_profile | Input | attribute_value_pairs | attribute_value_pairs |
| | | profile_type | String |
| | Output | profile_id | String |
| modify_profile | Input | profile_id | String |
| | | attribute_value_pairs | attribute_value_pairs |
| | Output | profile_id | String |
| Set_profile | Input | authorization | String |
| | | attribute_value_pairs | attribute_value_pairs |
| | Output | profile_id | String |

With respect to the user preferences 202, the automated page layout system 210 may accommodate any instruction received from the user. For example, the user preferences 202 may include an explicit user selection of specific layouts with high appeal 220 or a user profile 230 that is connected to a customer resource management (CRM) system 240. One skilled in the art will appreciate that the CRM system 240 may be a knowledge management system, document management system, database management system, or other types of files management systems. The user profile 230 is typically compared to the CRM system 240 to select layouts from a layout collection database 245. Next, the layout broker 250 may construct virtual documents based on the selected layouts. With the CRM system 240, the layouts preferred by similar customers, typically saved in the layout collection database 245, may be used to construct the virtual documents. The virtual documents may then be scored by the layout broker 250 based on the virtual documents' value with respect to the user preferences 202. For example, if a user prefers to have pages heavily weighted to the left or right to leave more open space on the pages, the user may request that contents appear on a diagonal or be clustered in a corner. The better the automated page layout system 210 matches the characteristics specified by the user, the higher the value of the virtual document is with respect to the user preferences 202. Thereafter, the layout broker 250 may consummate one or more trades to improve the virtual documents' value. After a number of trades the layout broker 250 may select the best document with a preferred layout, which is then sent to a composing program 260 for display or printing.

FIG. 3A is a flow chart illustrating an exemplary operation of the layout broker 250. As noted above, the layout broker 250 supervises and coordinates layout selection. First, the layout broker 250 selects a layout from a database that includes collections or other documents (block 310) and constructs a virtual document using the newly selected layout (block 315). Next, the layout broker 250 evaluates the newly selected layout (block 320) and calculates a value of the virtual document with respect to the user preferences 202 (block 330). The value of the virtual document may be calculated by comparing the attributes of the layout (such as such as size, positioning, density, or directional orientation) with the preferences defined by the user. The comparison may be explicit comparisons or other types of comparisons. If the value of the virtual document is increased with respect to the user preferences 202, the layout broker 250 consummates a trade to replace an old layout with the newly selected layout (block 340). The process of "select, construct, evaluate, calculate, and trade" is repeated until a stopping criterion is met (block 350). The stopping criterion may be met when the layout "perfectly" matches the user preferences 202, the automated page layout system 210 cannot further improve the value of the virtual documents, or a previously set number of cycles have been completed.

Once the stopping criteria have been met (block 350), the user may choose to validate the results (block 360), and modify preferences (block 370) for future trading. The user validation phase need not be automated, but may involve viewing the printed document and adding updated preferences. Alternatively, the user may modify preferences (block 370) through a graphical user interface (GUI) while the layout broker 250 continues with another round of trading. Finally, the virtual document with the highest value is selected to be sent for document layout and rendering (block 380).

Figure 3B:
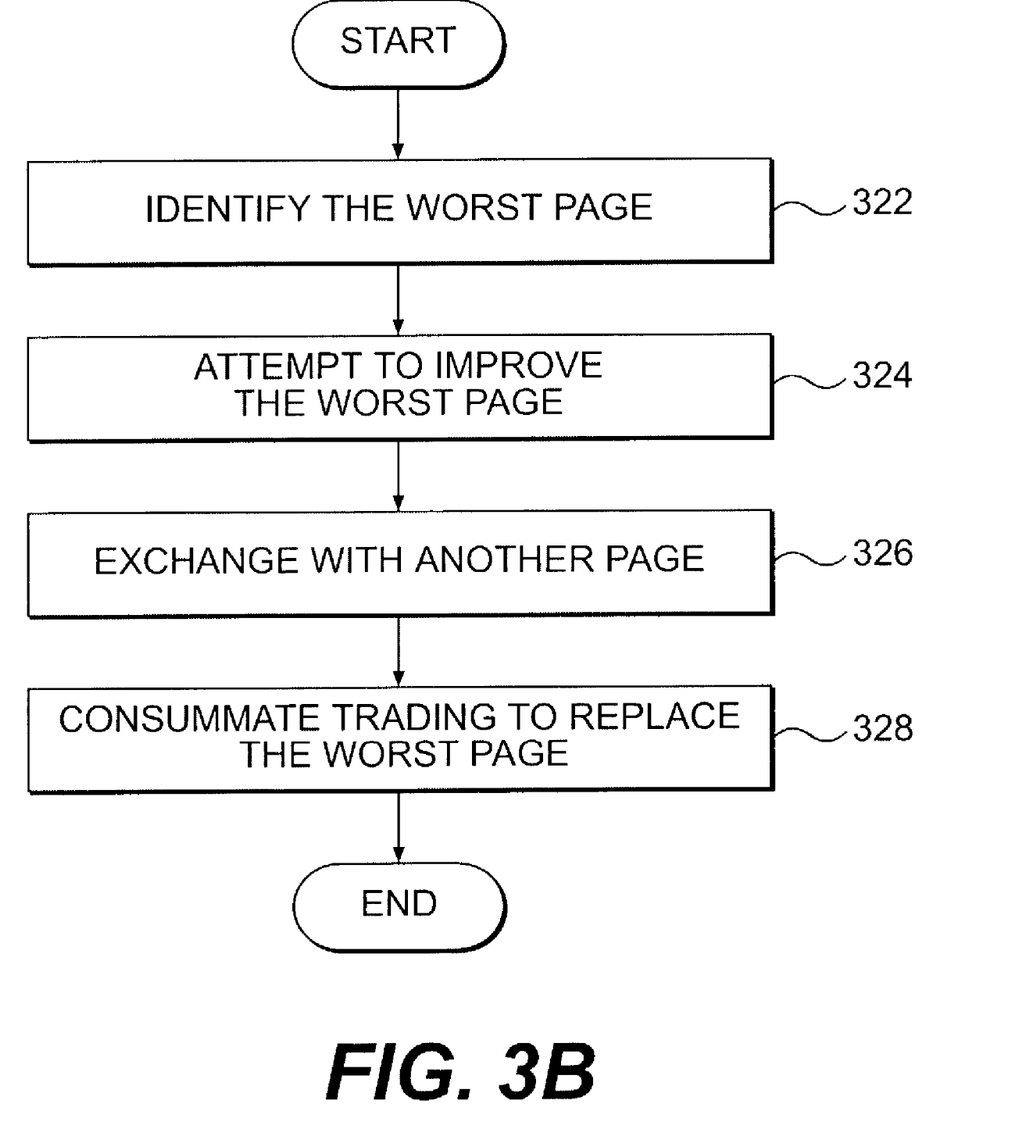
FIG. 3B illustrates an exemplary evaluation process of FIG. 3A, according to another embodiment of the present invention.

FIG. 3B illustrates an exemplary evaluation process of block 320. An exemplary layout selection algorithm may use an "Extremal Optimization" technique, which in general replaces extremely undesirable elements of a single sub-optimal solution with new, random elements. In the page layout selection context, the exemplary algorithm identifies the "worst" page (with respect to the user preferences 202) from the virtual documents (block 322) and attempts to improve the worst page (block 324). The improvements may be accomplished through exchanging layout with another page or with the collection database 245 (block 326). The layout broker 250 then consummates a trade (block 328) to replace the worst page with another page if both pages are improved as a result of the exchange (trade). If the trade is made with the collection database 245, only the worst page needs to improve its value before a trade is consummated.

Figure 4:
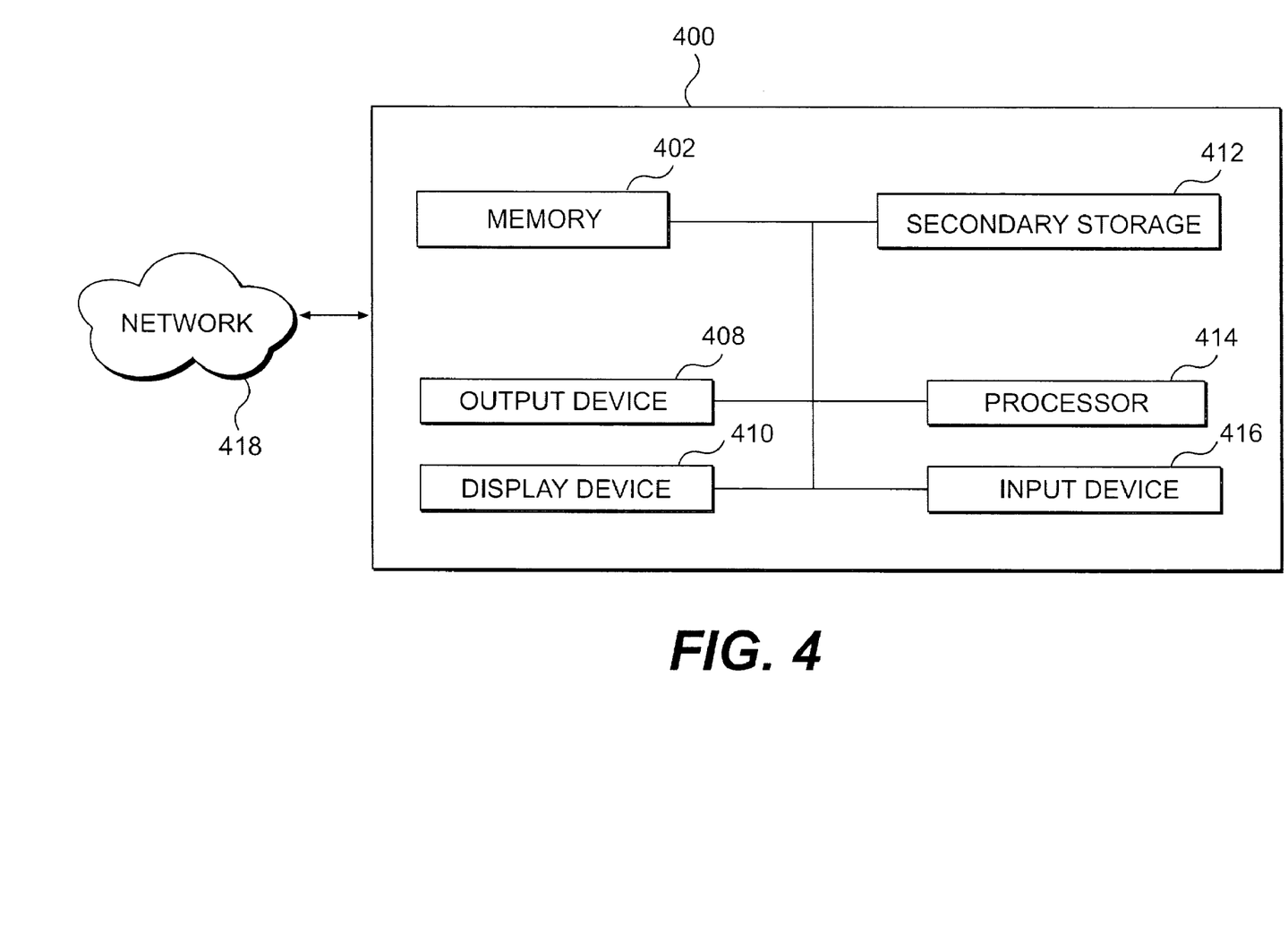
FIG. 4 illustrates exemplary hardware components that may be used in connection with the method for market-based document layout selection, according to another embodiment of the present invention.

FIG. 4 illustrates exemplary hardware components of a computer 400 that may be used in connection with the method for market-based document layout selection. The computer 400 includes a connection with a network 418 such as the Internet or other type of computer or telephone network. The computer 400 typically includes a memory 402, a secondary storage device 412, a processor 414, an input device 416, a display device 410, and an output device 408.

The memory 402 may include random access memory (RAM) or similar types of memory. The secondary storage device 412 may include a hard disk drive, floppy disk drive, CD-ROM drive, or other types of non-volatile data storage, and may correspond with various databases or other resources. The processor 414 may execute information stored in the memory 402, the secondary storage 412, or received from the Internet or other network 418. The input device 416 may include any device for entering data into the computer 400, such as a keyboard, keypad, cursor-control device, touch-screen (possibly with a stylus), microphone or the like. The display device 410 may include any type of device for presenting visual image, such as, for example, a computer monitor, flat-screen display, display panel or the like. The output device 408 may include any type of device for presenting data in hard copy format, such as a printer or printing device, and other types of output devices including speakers or any device for providing data in audio form. The computer 400 can possibly include multiple input devices, output devices, and display devices.

Although the computer 400 is depicted with various components, one skilled in the art will appreciate that the computer 400 can contain additional or different components. In addition, although aspects of an implementation consistent with the method for market-based document layout selection are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the computer 400 to perform a particular method.

While the method and apparatus for market-based document layout selection have been described in connection with an exemplary embodiment, those skilled in the art will understand that many modifications in light of these teachings are possible, and this application is intended to cover any variations thereof.

What is claimed is:

1. A computer-implemented apparatus for market-based document layout selection, comprising:
   a system configuration input that sets configuration parameters for a layout selection algorithm;
   a user preference input that sets user preferences for the layout selection algorithm; and
   an automated page layout system that uses the layout selection algorithm to automatically generate a page layout after the page layout cannot be improved based on the user preferences and stores the page layout in memory, wherein the automated page layout system includes a layout broker that supervises and coordinates the page layout generation.

2. The apparatus of claim 1, wherein the user preference input includes an explicit selection of a set of layouts.

3. The apparatus of claim 1, wherein the user preference input includes a selection based on a user profile.

4. A method for market-based document layout selection on a computer, comprising:
   selecting a plurality of page layouts from a database, wherein the page layouts are generated by placing objects within a page of a document;
   constructing a plurality of virtual documents using the plurality of selected page layouts;
   evaluating the plurality of selected page layouts with respect to user preferences;
   calculating values of the plurality of virtual documents based on the evaluation;
   consummating a trade from an old layout to one of the plurality of selected layouts, only if the value of the corresponding virtual document increases;
   generating a preferred layout from the plurality of selected layouts for document rendering, after the values of the plurality of virtual documents cannot be improved; and
   storing the preferred layout in memory.

5. The method of claim 1, wherein the evaluating step includes evaluating the plurality of selected layouts with respect to an explicit selection.

6. The method of claim 1, wherein the evaluating step includes evaluating the plurality of selected layouts with respect to a user profile.

7. The method of claim 6, further comprising comparing the user profile to a customer resource management (CRM) system to construct the plurality of virtual documents, wherein the CRM system includes a collection database.

8. The method of claim 1, wherein the evaluating step includes evaluating the plurality of selected layouts with respect to user preferred parameters, wherein the user preferred parameters include symmetry rules.

9. The method of claim 1, further comprising validating the selection of the plurality of page layouts.

10. The method of claim 1, further comprising modifying the user preferences based on the preferred layout.

11. The method of claim 1, wherein the generating step includes generating the preferred layout from the plurality of selected layouts, after one of the plurality of selected layouts matches the user preferences.

12. The method of claim 1, wherein the generating step includes generating the preferred layout from the plurality of selected layouts, after a set number of cycles are completed.

13. The method of claim 1, wherein the evaluating step comprises:
   identifying a worst page with respect to the user preferences from the virtual documents; and
   consummating a trade between the worst page and a second page if both pages are improved as a result of the trade.

14. A method for market-based document layout selection on a computer, comprising:
   selecting a plurality of page layouts from a database, wherein the page layouts are generated by placing objects within a page of a document;
   constructing a plurality of virtual documents using the plurality of selected page layouts;
   evaluating the plurality of selected page layouts with respect to user preferred parameters, wherein the user preferred parameters include symmetry rules;
   calculating values of the plurality of virtual documents based on the evaluation;
   consummating a trade from an old layout to one of the plurality of selected layouts, only if the value of the corresponding virtual document increases;
   generating a preferred layout from the plurality of selected layouts for document rendering, after a stopping criterion is met; and
   storing the preferred layout in memory.

15. A method for market-based document layout selection on a computer, comprising:

selecting a plurality of page layouts from a database, wherein the page layouts are generated by placing objects within a page of a document;

constructing a plurality of virtual documents using the plurality of selected page layouts by comparing a user profile to a customer resource management (CRM) system, wherein the CRM system includes a collection database;

evaluating the plurality of selected page layouts with respect to user preferences and the user profile;

calculating values of the plurality of virtual documents based on the evaluation;

consummating a trade from an old layout to one of the plurality of selected layouts, only if the value of the corresponding virtual document increases;

generating a preferred layout from the plurality of selected layouts for document rendering, after a stopping criterion is met; and storing the preferred layout in memory.

16. A computer readable storage medium with stored instructions for market-based document layout selection, the instructions comprising:

selecting a plurality of page layouts from a database, wherein the page layouts are generated by placing objects within a page of a document;

constructing a plurality of virtual documents using the plurality of selected page layouts;

evaluating the plurality of selected page layouts with respect to user preferences;

calculating values of the plurality of virtual documents based on the evaluation;

consummating a trade from an old layout to one of the plurality of selected layouts, if the value of the corresponding virtual document increases;

generating a preferred layout from the plurality of selected layouts for document rendering alter the values of the plurality of virtual documents cannot be improved, and storing the preferred layout in memory.

17. A computer readable storage medium with stored instructions for market-based document layout selection, the instructions comprising:

selecting a plurality of page layouts from a database, wherein the page layouts are generated by placing objects within a page of a document;

constructing a plurality of virtual documents using the plurality of selected page layouts;

evaluating the plurality of selected page layouts with respect to user preferences wherein the user preferences include symmetry rules;

calculating values of the plurality of virtual documents based on the evaluation;

consummating a trade from an old layout to one of the plurality of selected layouts, if the value of the corresponding virtual document increases;

generating a preferred layout from the plurality of selected layouts for document rendering, after a stopping criterion is met; and storing the preferred layout in memory.

18. The computer readable storage medium of claim 17, wherein the instructions for evaluating include instructions for evaluating the plurality of selected layouts with respect to an explicit selection.

19. The computer readable storage medium of claim 17, further comprising instructions for validating the selection of the plurality of page layouts.

20. The computer readable storage medium of claim 17, further comprising instructions for modifying the user preferences based on the preferred layout.

21. A computer-implemented apparatus for market-based document layout selection, comprising:

means for selecting a plurality of page layouts from a database, wherein the page layouts are generated by placing objects within a page of a document;

means for constructing a plurality of virtual documents using the plurality of selected page layouts;

means for evaluating the plurality of selected page layouts with respect to user preferences;

means for calculating values of the plurality of virtual documents based on the evaluation;

means for consummating a trade from an old layout to one of the plurality of selected layouts, only if the value of the corresponding virtual document increases; and means for generating a preferred layout from the plurality of selected layouts for document rendering, after the values of the plurality of virtual documents cannot be improved; and means for storing the i,referred layout in memory.

22. The apparatus of claim 21, further comprising means for modifying the user preferences based on the preferred layout.

23. The apparatus of claim 21, wherein the means for generating includes means for generating the preferred layout from the plurality of selected layouts, after one of the plurality of selected layouts matches the user preferences.

24. The apparatus of claim 21, wherein the means for generating includes means for generating the preferred layout from the plurality of selected layouts, after a set number of cycles are completed.

* * * * *

UNITED STATES PATENT AND TRADEMARK OFFICE
CERTIFICATE OF CORRECTION

PATENT NO. : 7,240,047 B2 Page 1 of 1
APPLICATION NO. : 10/326062
DATED : July 3, 2007
INVENTOR(S) : Henry W. Sang, Jr. et al.

It is certified that error appears in the above-identified patent and that said Letters Patent is hereby corrected as shown below:

In column 8, line 15, in Claim 5, delete "claim 1" and insert -- claim 4 --, therefor.

In column 8, line 18, in Claim 6, delete "claim 1" and insert -- claim 4 --, therefor.

In column 8, line 25, in Claim 8, delete "claim 1" and insert -- claim 4 --, therefor.

In column 8, line 29, in Claim 9, delete "claim 1" and insert -- claim 4 --, therefor.

In column 8, line 31, in Claim 10, delete "claim 1" and insert -- claim 4 --, therefor.

In column 8, line 33, in Claim 11, delete "claim 1" and insert -- claim 4 --, therefor.

In column 8, line 37, in Claim 12, delete "claim 1" and insert -- claim 4 --, therefor.

In column 8, line 40, in Claim 13, delete "claim 1" and insert -- claim 4 --, therefor.

In column 9, line 36, in Claim 16, delete "alter" and insert -- after --, therefor.

In column 10, line 38, in Claim 21, delete "i,referred" and insert -- preferred --, therefor.

Signed and Sealed this

Eleventh Day of August, 2009

David J. Kappos
*Director of the United States Patent and Trademark Office*